United States Patent
Maeda et al.

(10) Patent No.: US 8,940,937 B2
(45) Date of Patent: Jan. 27, 2015

(54) METHOD FOR PRODUCING SELECTIVELY FUNCTIONALIZED CARBON NANOTUBES

(75) Inventors: Yutaka Maeda, Tokyo (JP); Takeshi Akasaka, Ibaraki (JP)

(73) Assignee: Japan Science and Technology Agency, Saitama (JP)

( * ) Notice: Subject to any disclaimer, the term of this patent is extended or adjusted under 35 U.S.C. 154(b) by 6 days.

(21) Appl. No.: 13/577,011

(22) PCT Filed: Jan. 28, 2011

(86) PCT No.: PCT/JP2011/051817
§ 371 (c)(1),
(2), (4) Date: Oct. 16, 2012

(87) PCT Pub. No.: WO2011/096342
PCT Pub. Date: Aug. 11, 2011

(65) Prior Publication Data
US 2013/0030217 A1      Jan. 31, 2013

(30) Foreign Application Priority Data

Feb. 4, 2010  (JP) ................................ 2010-023553

(51) Int. Cl.
| | | |
|---|---|---|
| C01B 31/26 | (2006.01) | |
| C01B 31/02 | (2006.01) | |
| B82Y 30/00 | (2011.01) | |
| B82Y 40/00 | (2011.01) | |

(52) U.S. Cl.
CPC ......... C01B 31/0266 (2013.01); C01B 31/0273 (2013.01); B82Y 30/00 (2013.01); B82Y 40/00 (2013.01); Y10S 977/742 (2013.01); Y10S 977/745 (2013.01)
USPC ............ 564/426; 977/742; 977/745; 423/428

(58) Field of Classification Search
USPC ...................... 568/25; 423/428; 977/742, 745
See application file for complete search history.

(56) References Cited

U.S. PATENT DOCUMENTS

| | | | |
|---|---|---|---|
| 8,246,928 B1* | 8/2012 | Rao et al. ...................... | 423/460 |
| 2004/0028599 A1* | 2/2004 | Pierard et al. ................ | 423/447.1 |
| 2008/0308772 A1* | 12/2008 | Akasaka et al. .............. | 252/502 |
| 2009/0232724 A1* | 9/2009 | Afzali-Ardakani et al. ........................ | 423/447.2 |
| 2010/0166637 A1* | 7/2010 | Ziegler ....................... | 423/447.1 |
| 2010/0256290 A1* | 10/2010 | Costanzo et al. ............ | 524/539 |

FOREIGN PATENT DOCUMENTS

| | | | | |
|---|---|---|---|---|
| JP | 2006-131428 | * | 5/2006 | .............. C01B 31/02 |
| JP | 2007-70224 | | 3/2007 | |
| JP | 2009-046319 | * | 3/2009 | .............. C30B 29/04 |
| JP | 2009-242149 | | 10/2009 | |
| WO | 2004/106234 | | 12/2004 | |
| WO | 2006/013788 | | 2/2006 | |
| WO | 2009/008486 | | 1/2009 | |

OTHER PUBLICATIONS

Nakamura et al; Materials Research Society Symposium Proceedings, vol. 1039, 2008, 1039-P07-01.*
Bonesi et al; Inorganica Chimica Acta, 360 (2007) 1230-1234.*
Gupta et al; Canadian Journal of Chemistry, 58 (1980) 1350-1354.*
Chattopadhyay et al., "SET Mechanism in the Functionalization of Single-Walled Carbon Nanotubes", J. Phys. Chem., vol. 111, pp. 17928-17932, 2007.
Notification of Reasons for refusal issued Jul. 27, 2012 in corresponding Japanese Application No. 2011-552758, with English translation.

* cited by examiner

*Primary Examiner* — Sudhakar Katakam
*Assistant Examiner* — Pancham Bakshi
(74) *Attorney, Agent, or Firm* — Wenderoth, Lind & Ponack, L.L.P.

(57) ABSTRACT

Disclosed is a novel method for the selective molecular conversion of raw material carbon nanotubes containing a mixture of metallic carbon nanotubes and semiconductive carbon nanotubes in a manner that is based on the electrical properties or diameter of the carbon nanotubes.
The present invention causes a photoreaction of raw material carbon nanotubes containing a mixture of metallic carbon nanotubes and semiconductive carbon nanotubes with a disulfide or a sulfide of the following formula (I) or (II)

[Chemical Formula 1]

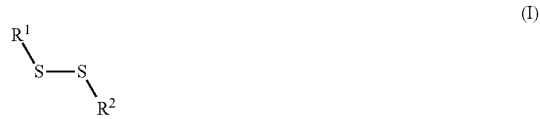

[Chemical Formula 2]

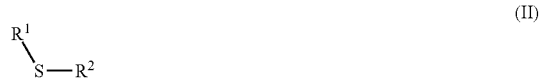

(wherein $R^1$ and $R^2$ each independently represent a hydrocarbon group that may have a substituent) in an organic solvent that contains the raw material carbon nanotubes and the disulfide of the formula (I) or the sulfide of the formula (II), so as to selectively functionalize the metallic carbon nanotubes, or functionalize the carbon nanotubes diameter selectively.

10 Claims, 15 Drawing Sheets

METHOD FOR PRODUCING SELECTIVELY FUNCTIONALIZED CARBON NANOTUBES

TECHNICAL FIELD

The present invention relates to a method for producing selectively functionalized carbon nanotubes.

BACKGROUND ART

Single-walled carbon nanotubes (SWNTs) unavoidably exist as a mixture of metallic and semiconductive single-walled carbon nanotubes (m-SWNTs, s-SWNTs) while being synthesized. To date, no method is proposed that enables m-SWNTs or s-SWNTs to be directly obtained in pure form during the synthesis process.

Accordingly, there is a need for a method that can be used to selectively obtain carbon nanotubes of specific properties based on m-SWNTs or s-SWNTs, using a synthesized mixture of m-SWNTs and s-SWNTs.

There are reports that functionalization of carbon nanotubes improves the properties of the carbon nanotubes, including improving dispersibility and increasing electrical resistance. It is known that functionalization on the side wall greatly changes the dispersibility and electronic properties of the carbon nanotubes.

Specifically, for example, for the purpose of minimizing the adverse effects on the conjugate system caused by the addition to the side wall, there have been attempts to introduce dendrimers with multifunctional groups to the side walls of carbon nanotubes. Further, it is also known that introducing organosilicon groups to the side walls improves the field emission characteristics of the carbon nanotubes, or develops n-type field-effect transistor (FET) characteristics. Indeed, the functionalization of the carbon nanotubes by functionalization is important for controlling the properties of the carbon nanotubes.

However, there are only a few reports concerning a technique that chemically modifies m-SWNTs or s-SWNTs through selective chemical reaction with a reagent. It is expected that the chemical reaction based on the electrical properties of carbon nanotubes would be useful for the separation of carbon nanotubes of different electrical properties, or for improving properties as a FET material.

Patent Document and Non-Patent Documents 1 and 2 describe chemically reacting carbon nanotubes with cyclic disulfides under ultraviolet irradiation. However, these publications are not suggestive of a finding with regard to the reactivity of the carbon nanotubes and linear disulfides, or selective functionalization based on the electrical properties or diameter of the carbon nanotubes.

Patent Document 1: JP-A-2006-131428
Non-Patent Document 1: Chemistry Letters 2006, 35, 742.
Non-Patent Document 2: Diamond & Related Materials 2007, 16, 1091-1094.

DISCLOSURE OF INVENTION

Problems that the Invention is to Solve

The present invention has been made under these circumstances, and it is an object of the invention to provide a novel method whereby raw material carbon nanotubes containing a mixture of metallic carbon nanotubes and semiconductive carbon nanotubes undergo selective functionalization based on the electrical properties or diameter of the carbon nanotubes.

Means for Solving the Problems

The present inventors conducted intensive studies, and found that carbon nanotubes undergo a photoreaction with a linear disulfide or a linear sulfide and produce active species in an organic solvent containing carbon nanotubes and a linear disulfide or a linear sulfide, and that the active species selectively functionalize the metallic carbon nanotubes, or functionalize the carbon nanotubes diameter selectively in a manner that is based on the clear difference in chemical reactivity determined by the electrical properties or diameter of the carbon nanotubes. The present invention has been completed based on this finding.

In order to achieve the foregoing object, a method for producing selectively functionalized carbon nanotubes according to the present invention includes causing a photoreaction of raw material carbon nanotubes containing a mixture of metallic carbon nanotubes and semiconductive carbon nanotubes with a disulfide or a sulfide of the following formula (I) or (II)

[Chemical Formula 1]

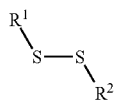

(I)

[Chemical Formula 2]

(II)

(wherein $R^1$ and $R^2$ each independently represent a hydrocarbon group that may have a substituent) in an organic solvent that contains the raw material carbon nanotubes and the disulfide of the formula (I) or the sulfide of the formula (II), so as to selectively functionalize the metallic carbon nanotubes.

Further, a method for producing selectively functionalized carbon nanotubes according to the present invention includes causing a photoreaction of raw material carbon nanotubes containing a mixture of metallic carbon nanotubes and semiconductive carbon nanotubes with a disulfide or a sulfide of the following formula (I) or (II)

[Chemical Formula 1]

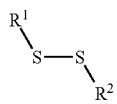

(I)

[Chemical Formula 2]

(II)

(wherein $R^1$ and $R^2$ each independently represent a hydrocarbon group that may have a substituent) in an organic solvent that contains the raw material carbon nanotubes and the disulfide of the formula (I) or the sulfide of the formula (II), so as to functionalize the carbon nanotubes diameter selectively.

Advantage of the Invention

The present invention enables the selective molecular conversion of metallic carbon nanotubes, or the diameter-selective molecular conversion of carbon nanotubes from raw material carbon nanotubes containing a mixture of metallic carbon nanotubes and semiconductive carbon nanotubes. The invention thus enables the physical properties of the carbon nanotubes to be controlled.

BEST MODE FOR CARRYING OUT THE INVENTION

Figure 1:
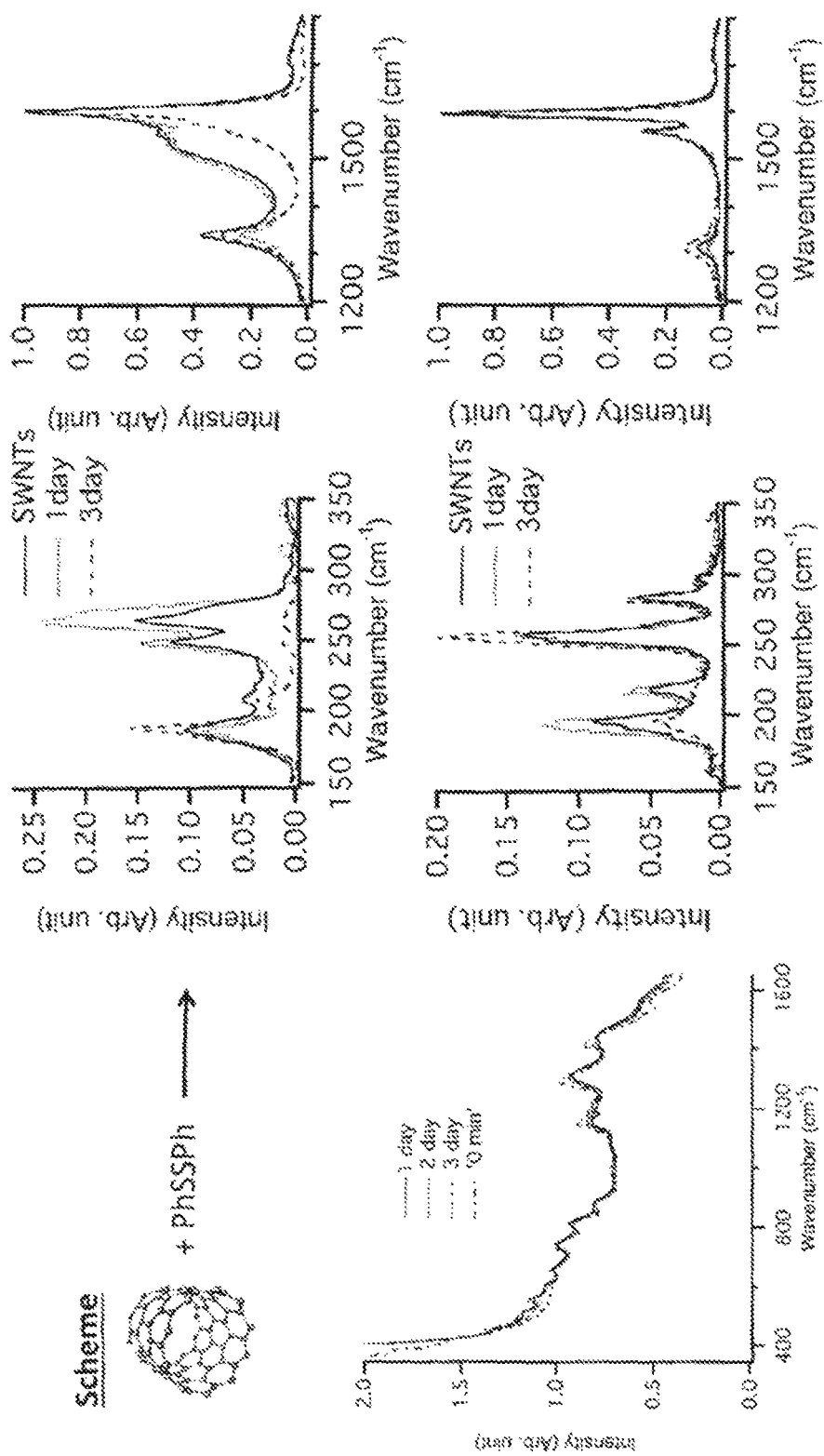
FIG. 1 represents the absorption spectra (left) and the Raman spectra (right: excitation wavelengths, 514.5 nm and 633 nm) of the single-walled carbon nanotubes of Example 1.

The present invention is described below in detail.

The method of the present invention includes causing a photoreaction of raw material carbon nanotubes containing a mixture of metallic carbon nanotubes and semiconductive carbon nanotubes with a disulfide of the formula (I) or a sulfide of the formula (II) in an organic solvent that contains the raw material carbon nanotubes and the disulfide of the formula (I) or the sulfide of the formula (II), so as to selectively functionalize the metallic carbon nanotubes, or functionalize the carbon nanotubes diameter selectively.

Experimental evidence has shown that an electron transfer reaction takes place between photoexcited semiconductor SWNTs and disulfide or sulfide to produce radical ion species, and that the superoxide anion radicals produced by the reaction between oxygen and SWNTs anion radicals produce persulfoxide with the disulfide cation radicals or sulfide cation radicals. It is believed that this persulfoxide intermediate selectively reacts with the metallic SWNTs, or with the SWNTs of a specific diameter.

The carbon nanotubes used as raw material in the present invention are not particularly limited, and, for example, single-walled carbon nanotubes, or multi-walled carbon nanotubes such as double-walled carbon nanotubes may be used. The method of production of the carbon nanotubes is not particularly limited either, and, for example, methods such as a HiPco method, an arc method, a laser abrasion method, and a CVD method may be used.

In the disulfide and the sulfide represented by the formulae (I) and (II), respectively, $R^1$ and $R^2$ each independently represent a hydrocarbon group that may have a substituent, for example, such as an aromatic hydrocarbon group, a saturated aliphatic hydrocarbon group, and an alicyclic hydrocarbon group, with or without a substituent. Examples include $C_6$-$C_{20}$, preferably $C_6$-$C_{14}$ aromatic hydrocarbon groups, $C_1$-$C_{40}$, preferably $C_1$-$C_{20}$ saturated aliphatic hydrocarbon groups, and $C_3$-$C_{40}$, preferably $C_3$-$C_{20}$ alicyclic hydrocarbon groups, with or without a substituent.

Examples of the aromatic hydrocarbon groups include $C_6$-$C_{20}$ aryl groups such as phenyl and naphthyl. The aromatic hydrocarbon groups may have at least one substituent selected from a halogen atom, a hydroxyl group, a $C_1$-$C_{40}$ alkoxy group, a $C_2$-$C_{40}$ alkoxycarbonyl group, a $C_6$-$C_{10}$ aryloxy group, and a $C_2$-$C_{40}$ acyl group.

Examples of the saturated aliphatic hydrocarbon groups include linear or branched alkyl groups such as methyl, ethyl, n-propyl, iso-propyl, n-butyl, iso-butyl, sec-butyl, tert-butyl, n-pentyl, iso-pentyl, sec-pentyl, neo-pentyl, tert-pentyl, n-hexyl, n-heptyl, n-octyl, n-nonyl, and n-decyl. The saturated aliphatic hydrocarbon groups may have at least one substituent selected from a halogen atom, a hydroxyl group, a $C_1$-$C_6$ alkoxy group, a $C_2$-$C_6$ alkoxycarbonyl group, a $C_6$-$C_{10}$ aryloxy group, and a $C_2$-$C_8$ acyl group.

Examples of the alicyclic hydrocarbon groups include cycloalkyl groups such as cyclohexyl, cycloheptyl, cyclooctyl, and norbornyl. The alicyclic hydrocarbon groups may have at least one substituent selected from a halogen atom, a hydroxyl group, a $C_1$-$C_6$ alkoxy group, a $C_2$-$C_6$ alkoxycarbonyl group, a $C_6$-$C_{10}$ aryloxy group, and a $C_2$-$C_8$ acyl group.

In the present invention, the amount of the disulfide of formula (I) or the sulfide of formula (II) used is not particularly limited, and may be in excess with respect to the amount of the carbon nanotubes. However, the extent of functionalization can be adjusted by reducing the amount of the disulfide of formula (I) or the sulfide of formula (II) with respect to the amount of the carbon nanotubes. As an example, the disulfide of formula (I) or the sulfide of formula (II) may be used in amounts of 0.05 to 1 M. The extent of functionalization also can be adjusted by reaction time.

The organic solvent used for the reaction is preferably one that dissolves the disulfide of formula (I). Examples of such organic solvents include ethers of preferably 4 to 6 carbon atoms such as tetrahydrofuran, 1,4-dioxane, and diethyl ether; aromatic hydrocarbons such as benzene, and hydrocarbons of preferably 5 to 10 carbon atoms such as hexane and cyclohexane. These may be used either alone or as a mixture of two or more. Preferred is tetrahydrofuran.

Using tetrahydrofuran, 1,4-dioxane, diethyl ether, benzene, hexane, or cyclohexane as the organic solvent enables the selective molecular conversion of the metallic carbon nanotubes.

Using toluene or xylene as the organic solvent enables the diameter-selective molecular conversion of the carbon nanotubes.

The photoreaction of the raw material carbon nanotubes with the disulfide of formula (I) or the sulfide of formula (II) can occur upon dissolving the disulfide of formula (I) or the sulfide of formula (II) in the organic solvent and dispersing the carbon nanotubes in the organic solvent under appropriate ultrasonic irradiation. Alternatively, a carbon nanotube thin film may be fabricated on a base such as quartz, and dipped in an organic solvent that contains the disulfide of formula (I) or the sulfide of formula (II). The reaction atmosphere is preferably an oxygen atmosphere such as in the atmosphere.

The reaction can easily proceed even at room temperature. The reaction temperature is not particularly limited, as long as it is no greater than the boiling point of the disulfide of formula (I) or the sulfide of formula (II). The reaction temperature may be, for example, −50 to 200° C. The reaction time is not particularly limited either. However, a long reaction time may cause the reaction to proceed not only for the metallic carbon nanotubes but also for the semiconductive carbon nanotubes.

The wavelength of light necessary for the photoreaction is from 200 to 2,000 nm, preferably 300 to 800 nm. The photoreaction between the metallic carbon nanotubes contained in the raw material carbon nanotubes and the disulfide of formula (I) or the sulfide of formula (II) can take place, for example, in the visible range of 400 nm to 800 nm, without UV irradiation.

The light source unit used for the photoreaction may be, for example, a halogen lamp, a mercury lamp, or a fluorescent lamp. Standing fluorescent lamps or room illuminations provide sufficient light quantities for the reaction to take place.

In the present invention, a photoreaction is performed between the raw material carbon nanotubes and the disulfide of formula (I) or the sulfide of formula (II) under the foregoing conditions. With the disulfide of formula (I) or the sulfide of formula (II), the metallic carbon nanotubes can undergo selective functionalization from the raw material carbon nanotubes containing metallic and semiconductive carbon nanotubes. The carbon nanotubes can also undergo diameter-selective functionalization.

As used herein, "selective" functionalization can be confirmed by clear property differences from the semiconductive carbon nanotubes manifested as, for example, disappearance of the characteristic absorption based on the metallic carbon nanotubes, a decrease of a Raman spectrum attributed to the metallic carbon nanotubes, and an increased $sp^3$ bond-derived D-band peak intensity, as will be described later in Examples.

The extent of the selective reaction can be clearly grasped, for example, from the following evaluations. First, the D band can provide relative information concerning the progression of the overall chemical reaction. The information concerning the selective chemical reaction can be converted into numerical values from changes in the RBM peak intensities or the areas of the metallic SWNTs and semiconductor SWNTs. The progression of the selective reaction also can be evaluated by a decrease in the RBM peak intensity in terms of a spectrum shape.

Note that the diameter selectivity means that the reaction occurs preferentially for carbon nanotubes of narrower diameters. For example, the reaction of the SWNTs with the disulfide of formula (I) or the sulfide of formula (II) in toluene used as the organic solvent proceeds in order of metallic SWNTs of narrower diameters, semiconductor SWNTs of narrower diameters, metallic SWNTs of thicker diameters, and semiconductor SWNTs of thicker diameters.

The method of the present invention enables the physical properties of carbon nanotubes to be controlled through the selective functionalization of the metallic carbon nanotubes, or through the diameter-selective functionalization of the carbon nanotubes from the raw material carbon nanotubes containing a mixture of metallic carbon nanotubes and semiconductive carbon nanotubes. The method therefore has potential applications in a variety of fields, including improving the properties of carbon nanotubes as FET material.

EXAMPLES

The present invention is described in more detail below using Examples. It should be noted that the present invention is in no way limited by the following Examples.

In the Examples and Comparative Examples below, the progression of the selective chemical reaction based on the electrical properties or diameter of the mixture containing metallic SWNTs and semiconductive SWNTs was evaluated using such features as the characteristic absorption in an absorption spectrum, and the RBM and the proportion of a D-band increase in a Raman spectrum.

Absorption spectra (ultraviolet-visible-nearinfrared absorption spectra) were taken by using a spectrophotometer (UV-3150; Shimadzu Corporation).

For the Raman spectrum measurement, a film was produced by processing the carbon nanotubes by suction filtration, and measured at laser excitation wavelengths of 514.5 nm and 632.8 nm using a Raman spectroscope (LabRAM HR-800; Horiba Ltd.).

As the light source for the photoreaction, a white fluorescent lamp (Sunline FL15SW-6; Hitachi Lighting Ltd.) was mainly used for irradiation (wavelength, 300 nm or higher).

Example 1

Single-walled carbon nanotubes (SWNTs; HiPco method; 0.1 mg) were placed in a PYREX® reaction vessel, and 10 ml of tetrahydrofuran (THF) containing 0.05 M diphenyl disulfide was added. The mixture was irradiated with ultrasonic waves in the atmosphere for 2 hours. Here, light from the light source white fluorescent lamp was also used for irradiation.

Ultrasonic irradiation was performed at 24-hour intervals for the duration of 2 hours each time, and the solution was measured by taking absorption spectra after 1, 2, and 3 days. The result confirmed the disappearance of the characteristic absorption based on the metallic SWNTs (FIG. 1, left).

Raman spectrum measurement was performed after filtering the solution (after 1, 2, and 3 days) through a PTFE membrane filter. The result confirmed a decrease in the Raman spectrum attributed to the metallic SWNTs, and an increased $sp^3$ bond-derived D-band peak intensity, showing that the chemical reaction proceeded selectively for the metallic SWNTs (FIG. 1, right).

Example 2

Single-walled carbon nanotubes (SWNTs; HiPco method; 0.1 mg) were placed in a PYREX® reaction vessel, and 10 ml of tetrahydrofuran (THF) containing 0.05 M diphenyl disulfide was added. The mixture was irradiated with ultrasonic waves in the atmosphere for 9 hours or 12 hours. Here, light from the light source white fluorescent lamp was also used for irradiation.

Figure 2:
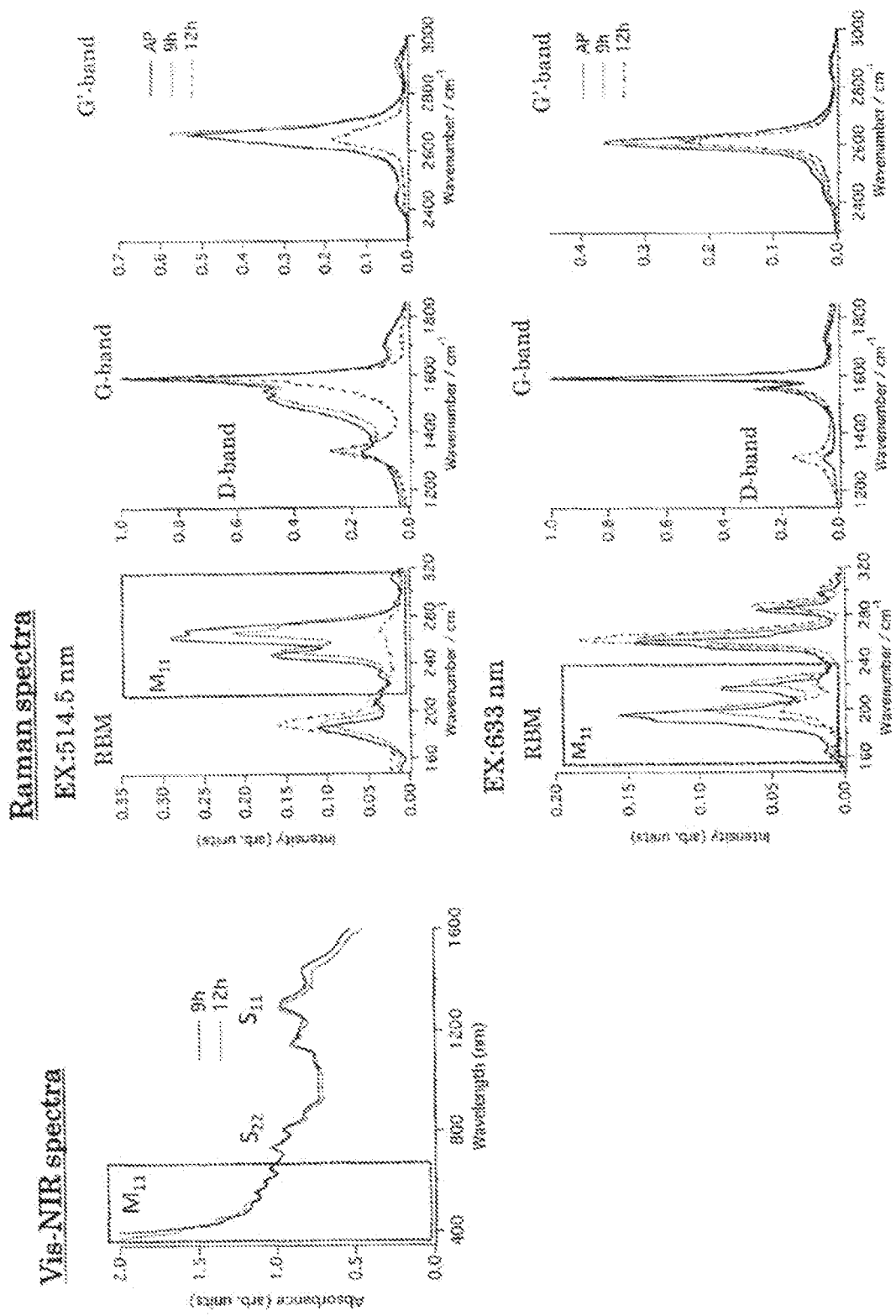
FIG. 2 represents the absorption spectra (left) and the Raman spectra (right: excitation wavelengths, 514.5 nm and 633 nm) of the single-walled carbon nanotubes of Example 2.

Absorption spectrum measurement of the solution confirmed the disappearance of the characteristic absorption based on the metallic SWNTs (FIG. 2, left).

Raman spectrum measurement was performed after filtering the solution through a PTFE membrane filter. The result confirmed a decrease in the Raman spectrum attributed to the metallic SWNTs, and an increased $sp^3$ bond-derived D-band peak intensity, showing that the chemical reaction proceeded selectively for the metallic SWNTs (FIG. 2, right).

The selective interaction based on the electrical properties proceeds as the ultrasonic irradiation time increases. This is believed to be due to the improved isolation of the SWNTs in the dispersion system after the ultrasonic irradiation.

Example 3

A thin film of single-walled carbon nanotubes (SWNTs; HiPco method) was fabricated on a quartz base by using a spray method, and dipped in 10 ml of tetrahydrofuran (THF) containing diphenyl disulfide. Here, light from the light source white fluorescent lamp was used for irradiation.

The base was taken out after 48 hours, washed with methanol, and measured by taking absorption spectra. The result confirmed the disappearance of the characteristic absorption based on the metallic SWNTs (FIG. 3, left).

Figure 3:
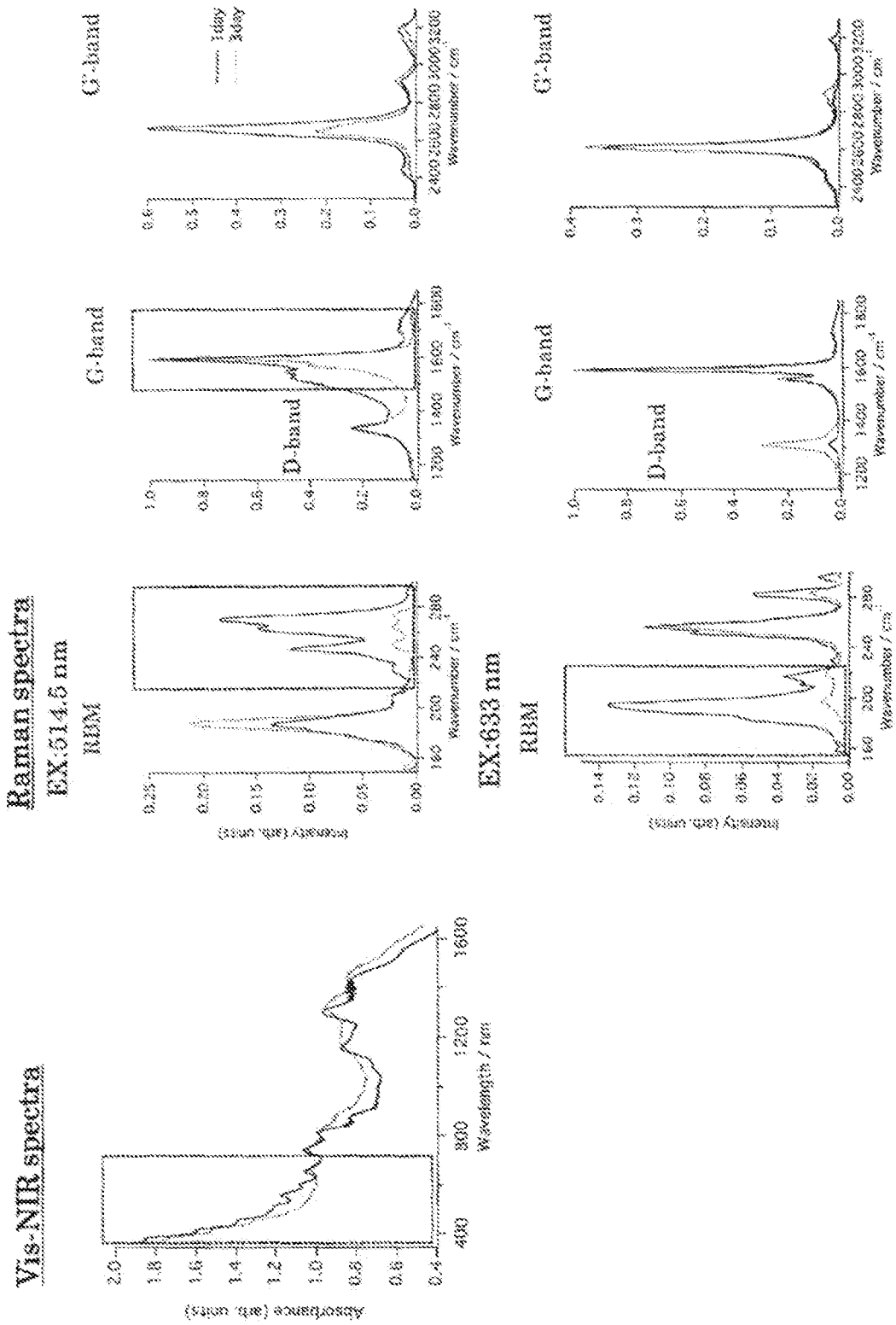
FIG. 3 represents the absorption spectra (left) and the Raman spectra (right: excitation wavelengths, 514.5 nm and 633 nm) of the single-walled carbon nanotubes of Example 3.

Raman spectrum measurement confirmed a decrease in the Raman spectrum attributed to the metallic SWNTs, and an increased $sp^3$ bond-derived D-band peak intensity, showing that the chemical reaction proceeded selectively for the metallic SWNTs (FIG. 3, right).

The SWNTs sprayed onto the thin film are highly isolated. A time-course study of changes with reaction time conducted in the same manner as for the reaction in the solution of Example 1 showed improved reactivity over the reactivity in the solution. As demonstrated in this study, the reactivity improves when the SWNTs have high isolation.

Example 4

Reaction was performed under the same conditions used in Example 1, except that different organic solvents were used. THF, hexane, dioxane, diethyl ether, and benzene were used as organic solvents.

Figure 4:
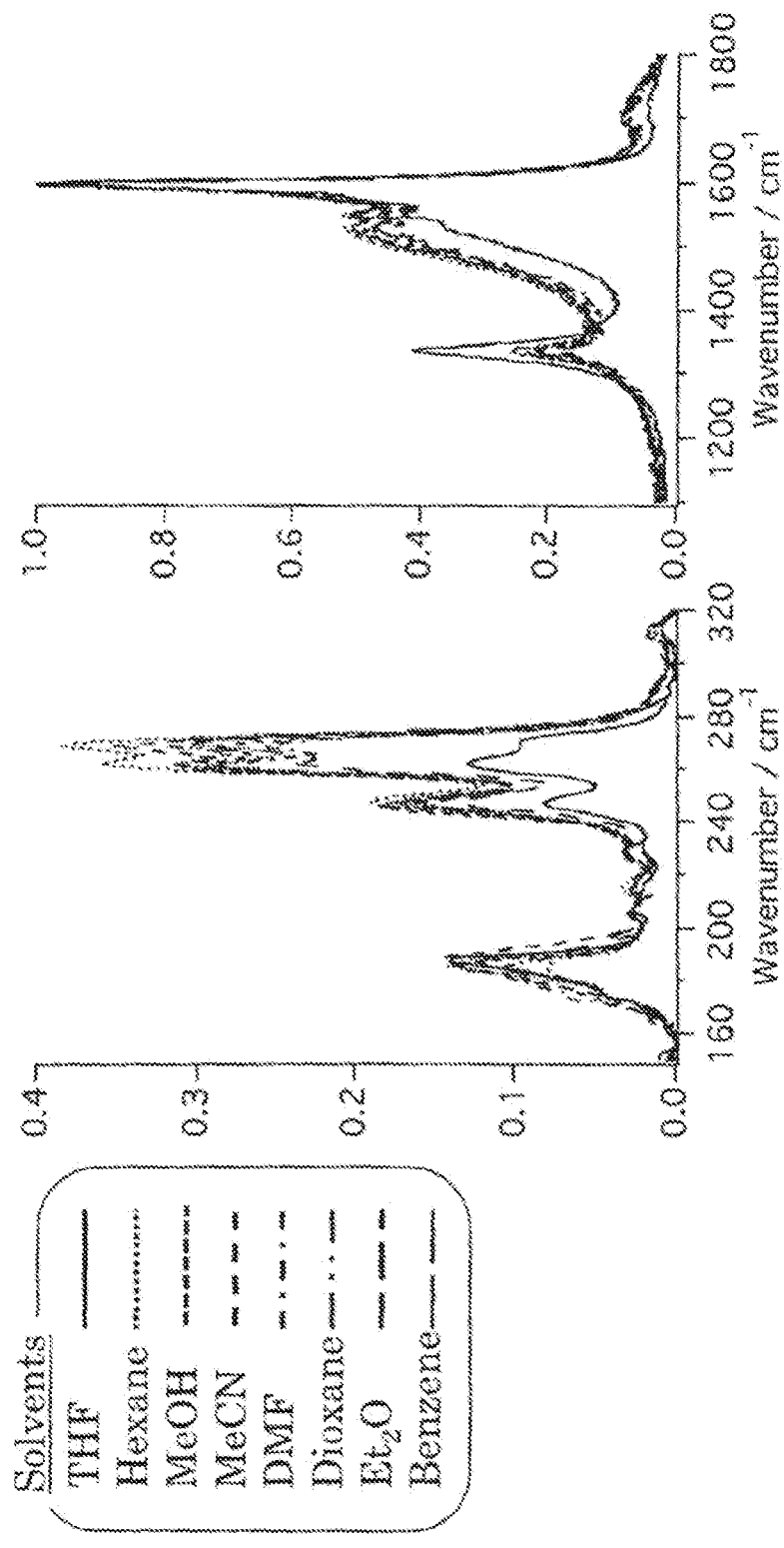
FIG. 4 represents the Raman spectra (excitation wavelength, 514.5 nm) of the single-walled carbon nanotubes of Example 4.

FIG. 4 represents the result of the Raman spectrum measurement taken after 3 days. The reaction efficiently proceeded, particularly with THF.

Comparative Example 1

A thin film of single-walled carbon nanotubes (SWNTs; HiPco method) was fabricated on a quartz base by using a spray method, and dipped in 10 ml of tetrahydrofuran (THF) containing diphenyl disulfide. The sample was then left unattended in the dark.

Figure 5:
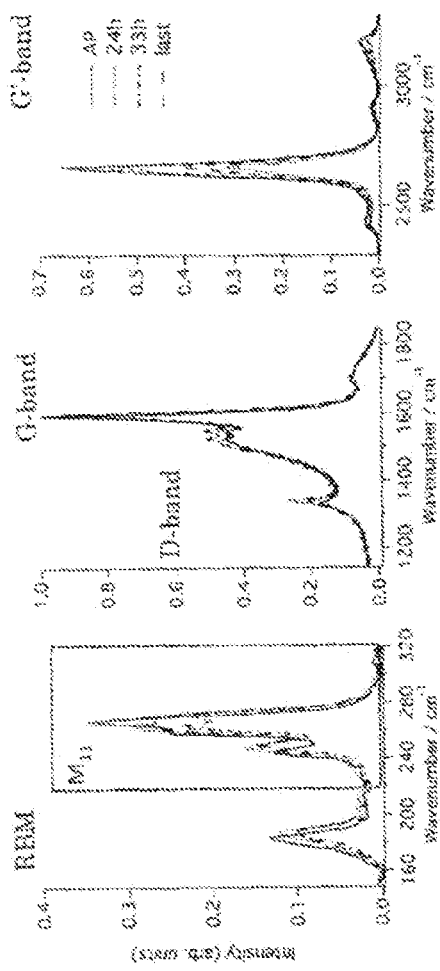
FIG. 5 represents the absorption spectra (left) and the Raman spectra (right: excitation wavelengths, 514.5 nm and 633 nm) of the single-walled carbon nanotubes of Comparative Example 1.
Figure 5:
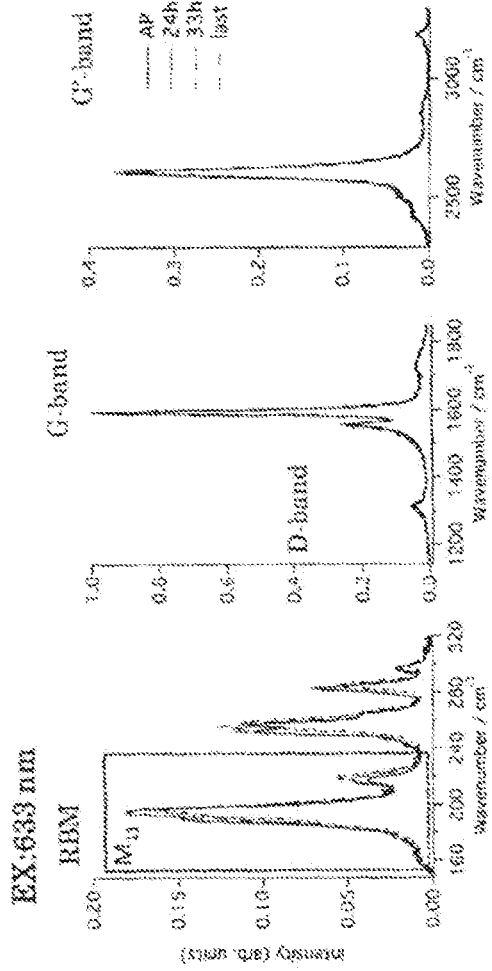
Figure 5:
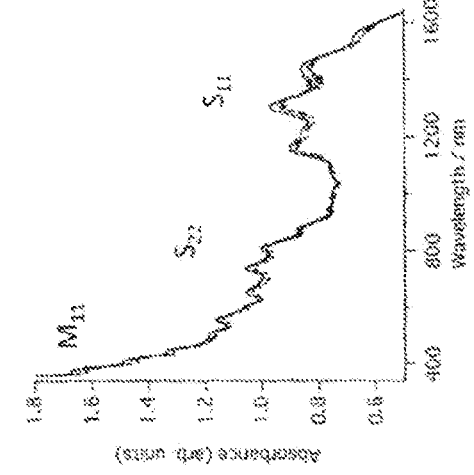

The base was taken out after 190 hours, washed with methanol; and measured by taking absorption spectra and Raman spectra. The results confirmed no change in the spectra (FIG. 5, left), suggesting that the reaction was suppressed (FIG. 5, right).

Comparative Example 2

Single-walled carbon nanotubes (SWNTs; HiPco method; 0.1 mg) were placed in a PYREX® reaction vessel, and 10 ml of tetrahydrofuran (THF) containing 0.05 M diphenyl disulfide and 2,6-di-tert-butyl-4-methylphenol (a known stabilizer) was added. The mixture was irradiated with ultrasonic waves in the atmosphere for 2 hours. Here, light from the light source white fluorescent lamp was also used for irradiation.

Ultrasonic irradiation was performed at 24-hour intervals for the duration of 2 hours each time, and the solution was measured by taking an absorption spectrum after 3 days. The result confirmed no change in the spectrum, suggesting that the reaction was suppressed.

Figure 6:
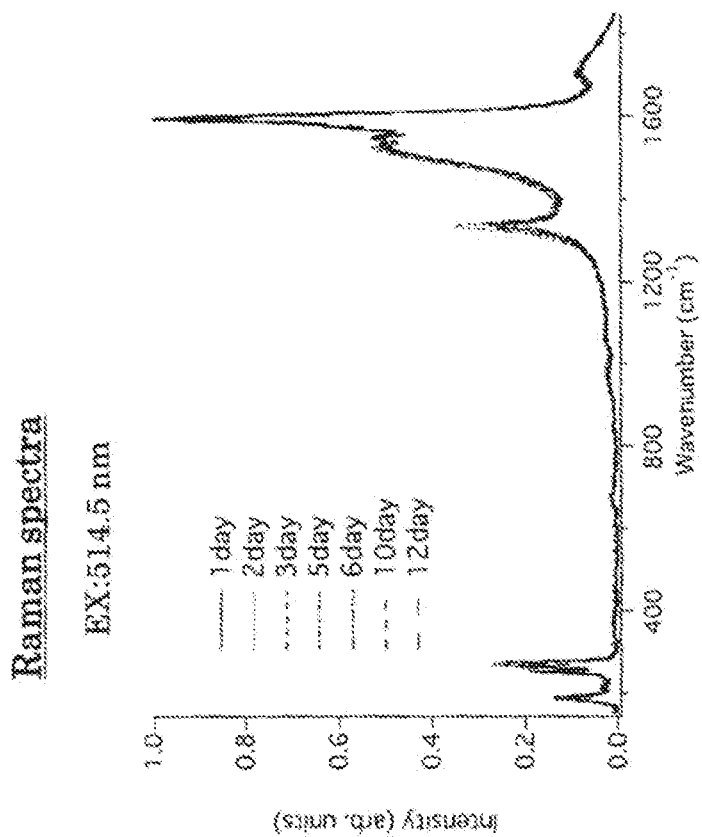
FIG. 6 represents the Raman spectra (excitation wavelength, 514.5 nm) of the single-walled carbon nanotubes of Comparative Example 2.
Figure 6:
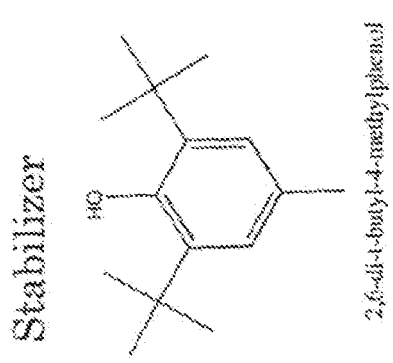

Raman spectrum measurement was performed after filtering the solution (after 3 days) through a PTFE membrane filter. The result confirmed no change in the spectrum, suggesting that the reaction was suppressed (FIG. 6).

The reaction was also suppressed when propylamine was used as a stabilizer in place of the 2,6-di-tert-butyl-4-methylphenol.

Example 5

Single-walled carbon nanotubes (SWNTs; HiPco method; 0.1 mg) were placed in a PYREX® reaction vessel, and 10 ml of tetrahydrofuran (THF) containing 0.05 M diphenyl disulfide was added. The mixture was irradiated with ultrasonic waves in the atmosphere for 2 hours.

Figure 7:
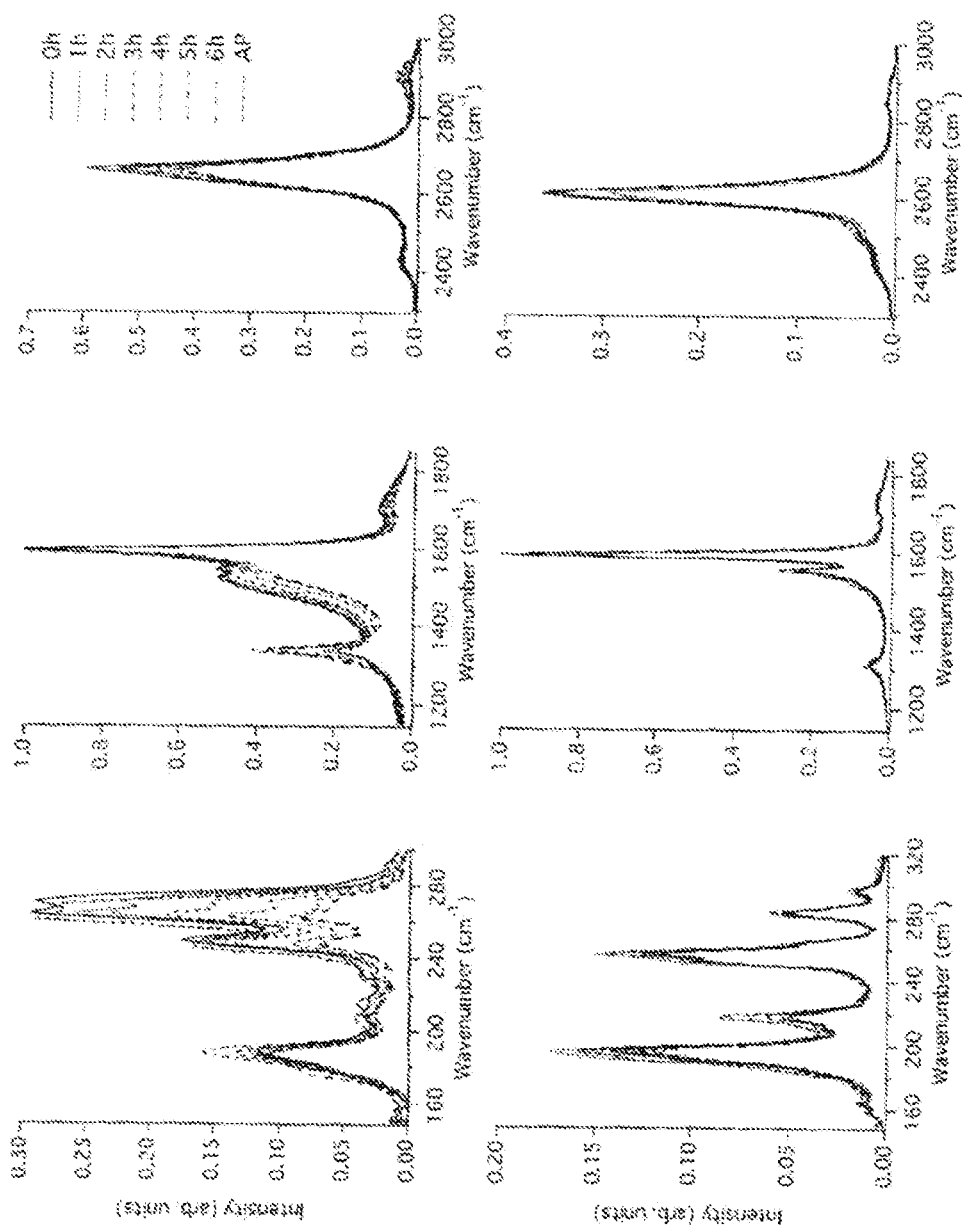
FIG. 7 represents the Raman spectra (excitation wavelengths, 514.5 nm, 633 nm) of the single-walled carbon nanotubes of Example 5.

The sample was further irradiated with light (490 nm or higher) for 6 hours using a halogen lamp (JCV100V-500WA; Ushio Lighting Inc.) as the light source. Absorption spectrum measurement of the solution confirmed the disappearance of the characteristic absorption based on the metallic SWNTs (FIG. 7, left).

Raman spectrum measurement was performed after filtering the solution through a PTFE membrane filter. The result confirmed a decrease in the Raman spectrum attributed to the metallic SWNTs, and an increased $sp^3$ bond-derived D-band peak intensity, showing that the chemical reaction proceeded selectively for the metallic SWNTs (FIG. 7, right).

Example 6

Single-walled carbon nanotubes (SWNTs; HiPco method; 0.1 mg) were placed in a PYREX® reaction vessel, and 10 ml of tetrahydrofuran (THF) containing 0.05 M diphenyl disulfide was added. The mixture was irradiated with ultrasonic waves in the atmosphere for 2 hours. Here, light from the light source white fluorescent lamp was also used for irradiation.

Figure 8:
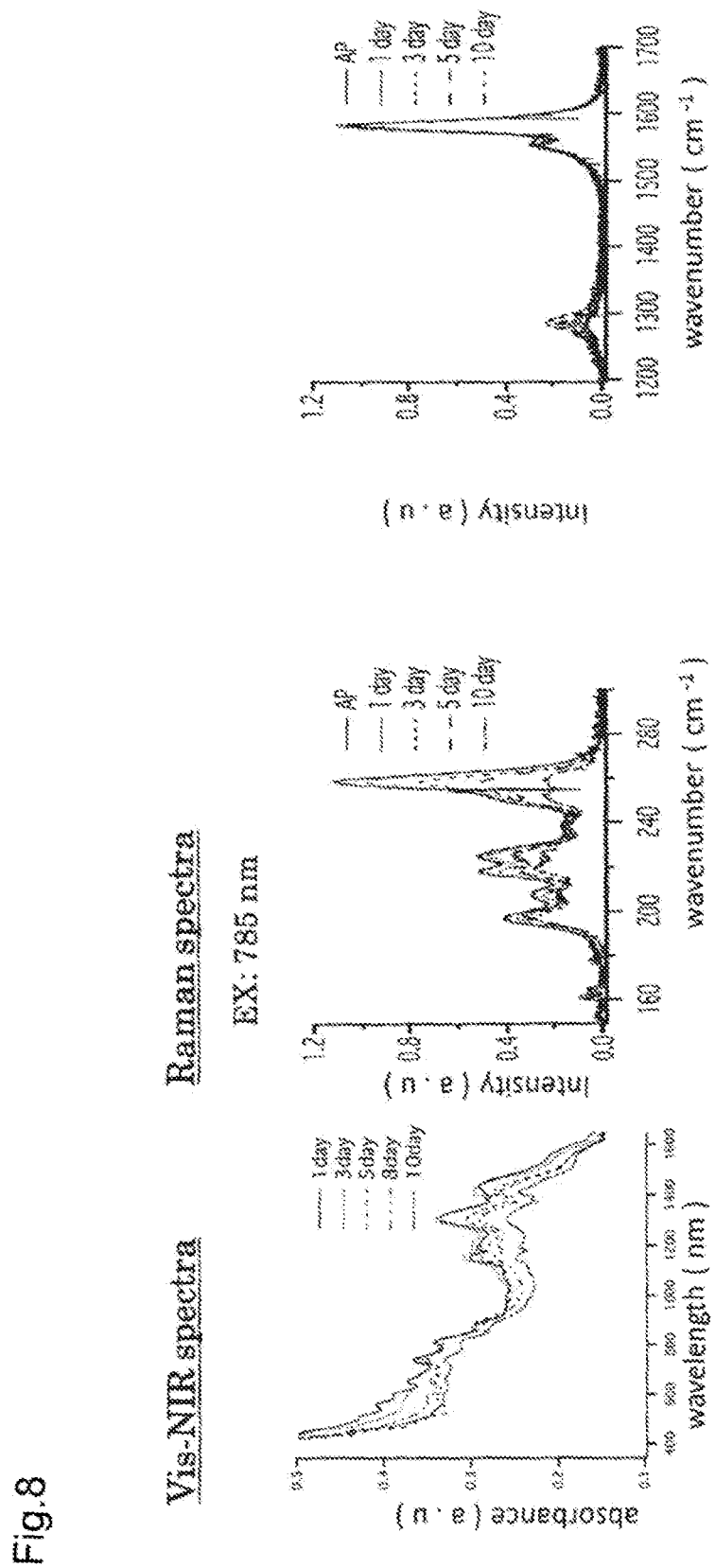
FIG. 8 represents the absorption spectra (left) and the Raman spectra (right: excitation wavelength, 785 nm) of the single-walled carbon nanotubes of Example 6.

Ultrasonic irradiation was performed at 24-hour intervals for the duration of 2 hours each time, and the solution was measured by taking an absorption spectrum after 3 days. The result confirmed the disappearance of the characteristic absorption based on the metallic SWNTs (FIG. 8, left).

Raman spectrum measurement was performed after filtering the solution (after 3 days) through a PEFE membrane filter. The result confirmed a decrease in the Raman spectrum attributed to the metallic SWNTs, and an increased $sp^3$ bond-derived D-band peak intensity, showing that the chemical reaction proceeded selectively for the metallic SWNTs (FIG. 8, right).

Ultrasonic irradiation was performed at 24-hour intervals for the duration of 2 hours each time, and the solution was measured by taking an absorption spectrum after 10 days. The result confirmed the disappearance of the characteristic absorption based on the semiconductor SWNTs, in addition to the characteristic absorption based on the metallic SWNTs (FIG. 8, left).

Raman spectrum measurement was performed after filtering the solution through a PEFE membrane filter. The result confirmed a decrease in the Raman spectra attributed to both the metallic SWNTs and the semiconductor SWNTs, and an increased $sp^3$ bond-derived D-band peak intensity, demonstrating the successive progression of the chemical reaction for the metallic SWNTs and the chemical reaction for the semiconductor SWNTs (FIG. 8, right). As demonstrated above, the reaction proceeded diameter selectively for SWNTs having the same levels of conductivity.

Example 7

The reaction was performed under the same conditions used in Example 1, except that different disulfides were used. In addition to the diphenyl disulfide, disulfides having a methyl group, methoxy group, a chlorine atom, a dodecyl group, an amino group, or a nitro group introduced as substituent R to the phenyl group (FIG. 10, left) were used, along with di-n-butyldisulfide, di-tert-butyldisulfide, and dicyclohexyldisulfide.

Figure 9:
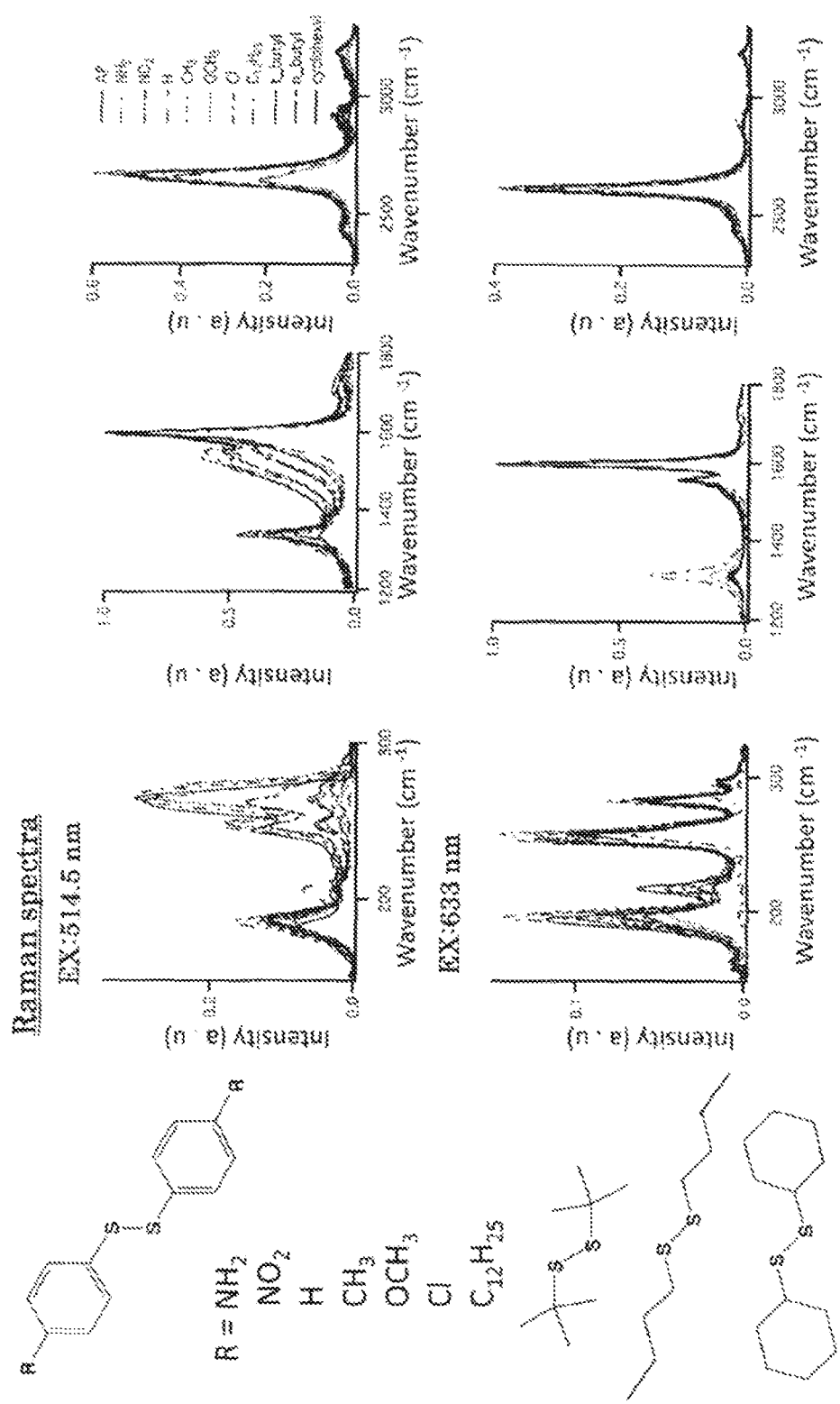
FIG. 9 represents the Raman spectra (excitation wavelengths, 514.5 nm and 633 nm) of the single-walled carbon nanotubes of Example 7.

FIG. 9 represents the result of absorption Raman spectrum measurement taken after 3 days. As shown in the figure, the disappearance of the characteristic absorption based on the metallic SWNTs was confirmed with the various disulfides. Raman spectrum measurements performed after filtering the solution through a PEFE membrane filter confirmed a decrease in the Raman spectrum attributed to the metallic SWNTs, and an increased $sp^3$ bond-derived D-band peak intensity with the various disulfides, showing that the chemical reaction proceeded selectively for the metallic SWNTs.

Reactivity lowered when a disulfide having an amino group or a nitro group introduced as substituent R was used. This is believed to be due to the suppression of the electron transfer with the disulfide.

Example 8, Comparative Example 3

Figure 10:
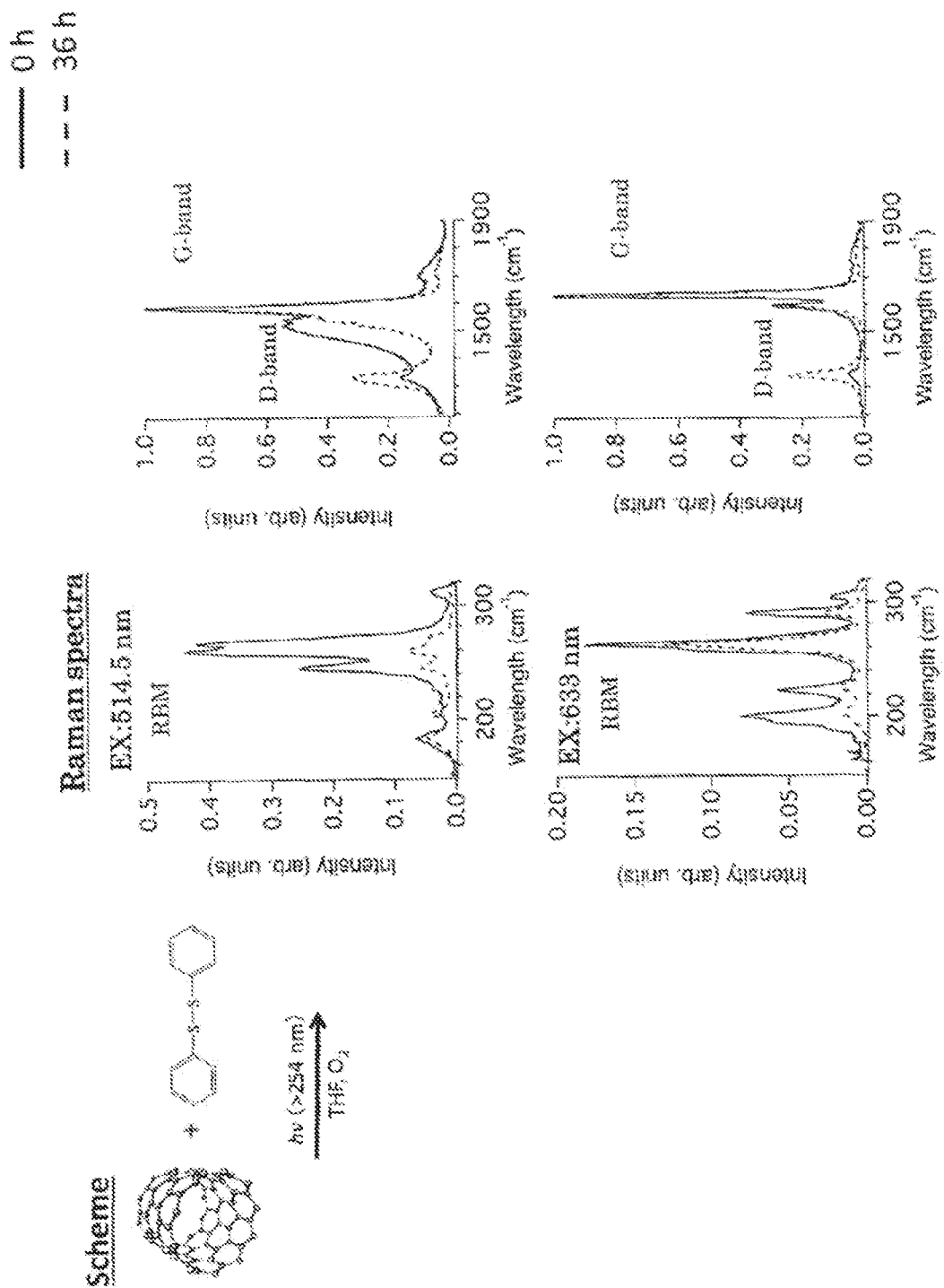
FIG. 10 represents the Raman spectra (excitation wavelengths, 514.5 nm and 633 nm) of the single-walled carbon nanotubes of Example 8 and Comparative Example 3.

The linear disulfide of formula (I) and a cyclic disulfide were compared for reactivity. In Example 8, SWNTs were placed in a PYREX® reaction vessel, and an organic solvent containing diphenyl disulfide was added to test a photoreaction, as in Example 1. FIG. 10 represent the result of the photoirradiation in the ultraviolet to visible region (light wavelength 254 nm<) with the organic solvent THF in an oxygen atmosphere, FIG. 11 the result of the photoirradiation in the visible region (light wavelength 500 nm<) with the organic solvent THF in an oxygen atmosphere, and FIG. 12 the result of the photoirradiation in the ultraviolet to visible region (light wavelength 254 nm<) with the organic solvent acetonitrile in an oxygen atmosphere. The selective chemical reaction for the metallic SWNTs proceeded in all cases, and the reaction also proceeded diameter selectively with acetonitrile (with which the reaction hardly proceeds compared to the THF-oxygen system).

Figure 13:
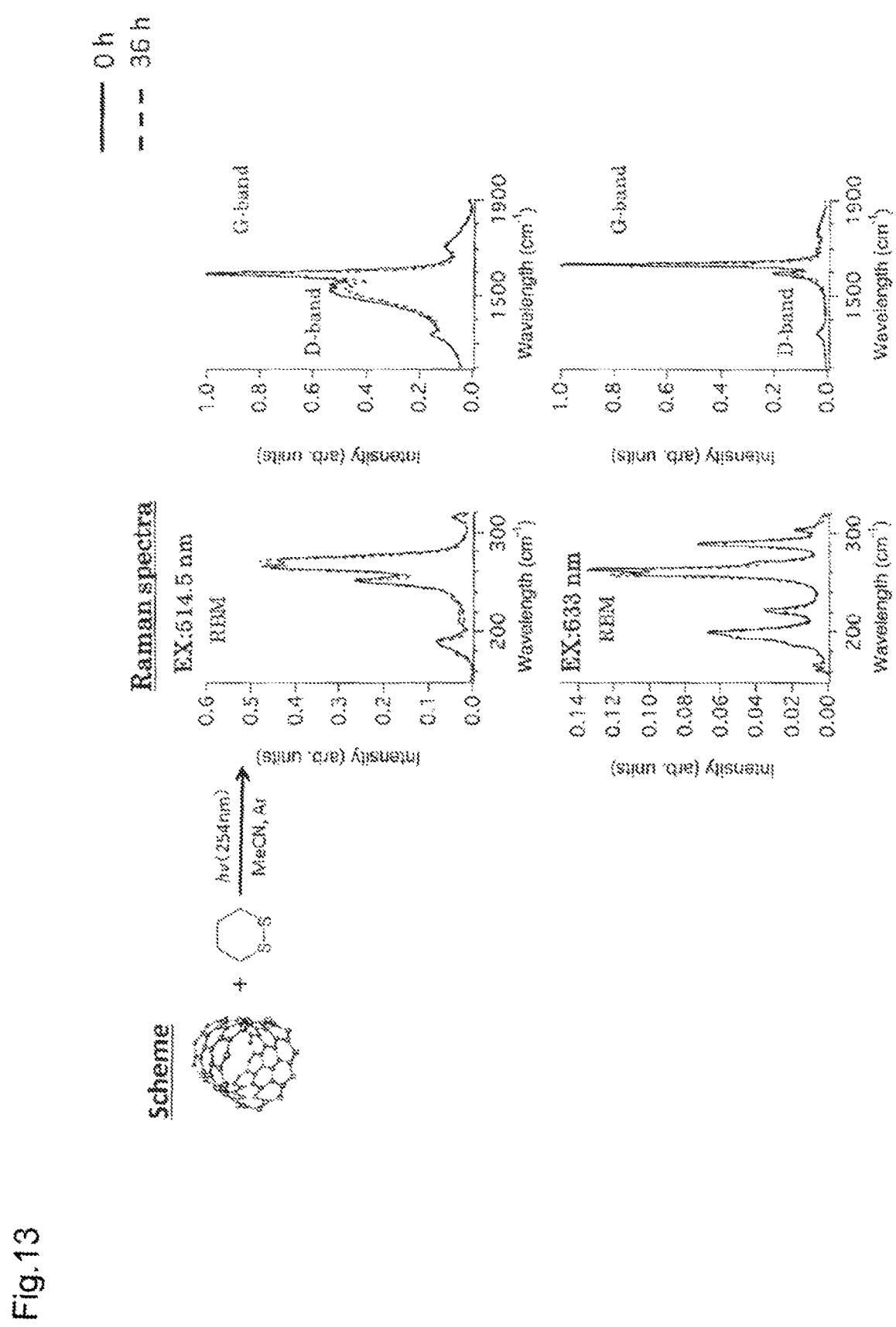
FIG. 13 represents the Raman spectra (excitation wavelengths, 514.5 nm and 633 nm) of the single-walled carbon nanotubes of Comparative Example 3.

In Comparative Example 3, dithiane was used as the cyclic disulfide, and photoirradiation was performed in the ultraviolet to visible region (light wavelength 254 nm<) with the organic solvent acetonitrile in an Ar atmosphere (FIG. 13).

Figure 11:
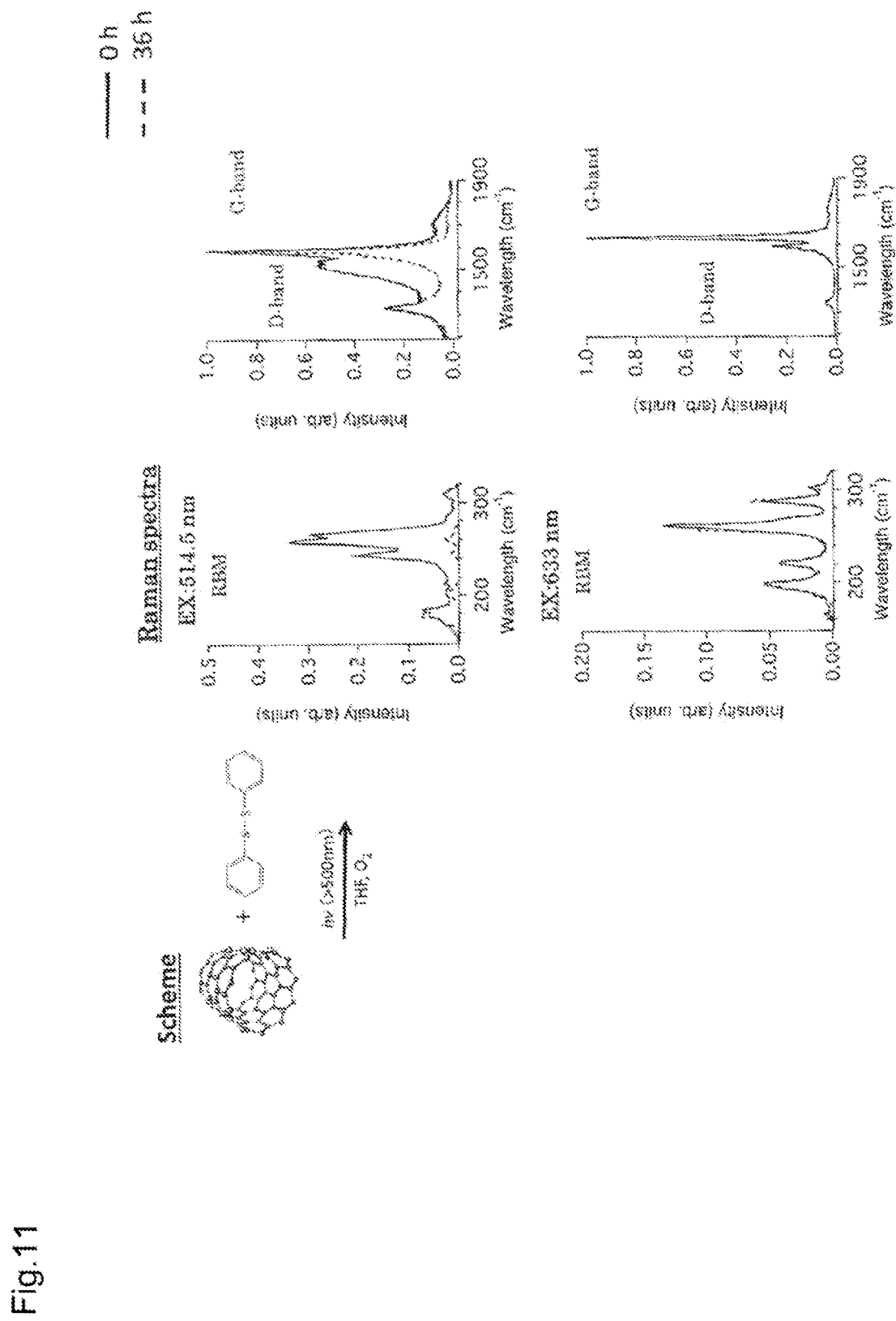
FIG. 11 represents the Raman spectra (excitation wavelengths, 514.5 nm and 633 nm) of the single-walled carbon nanotubes of Example 8.
Figure 12:
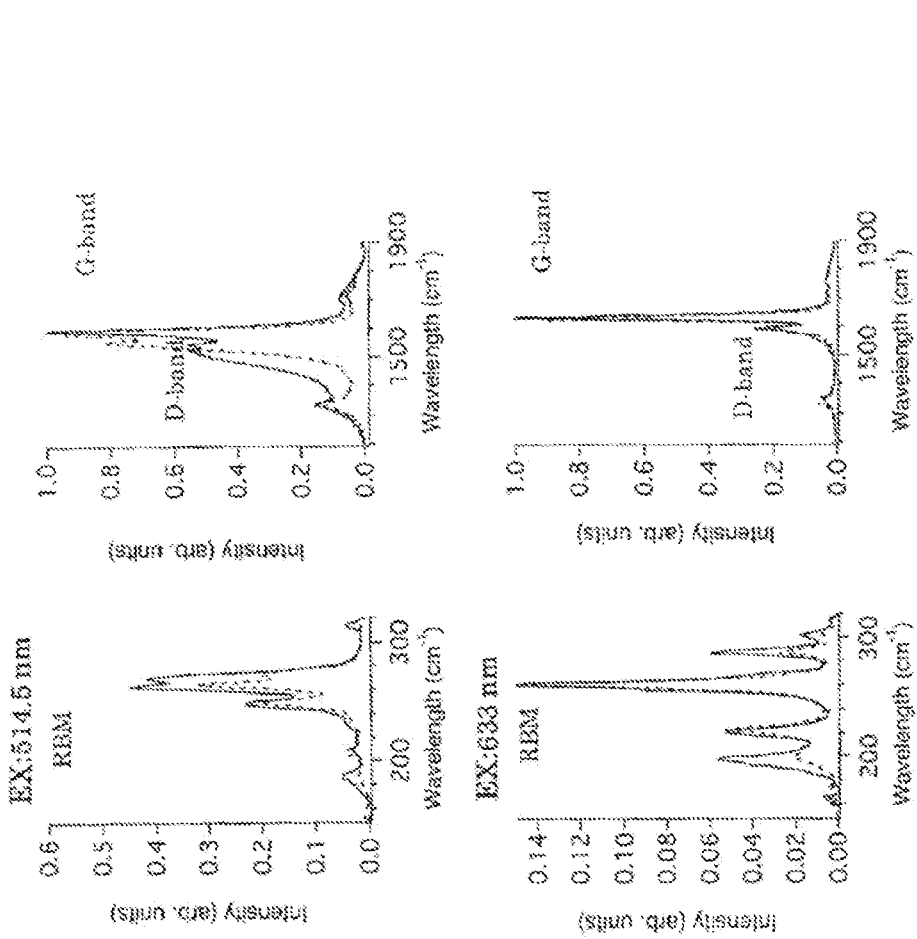
FIG. 12 represents the Raman spectra (excitation wavelengths, 514.5 nm and 633 nm) of the single-walled carbon nanotubes of Example 8.
Figure 12:
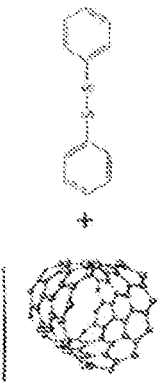

While the reaction proceeds even under the absorbing conditions only for the SWNTs when the linear disulfide, diphenyl disulfide, is used (in oxygen; FIG. 11), the reaction proceeds only under the absorbing conditions for the SWNTs and sulfur when the cyclic disulfide, dithiane, is used. Further, though not shown in the figure, the reactivity lowers with the diphenyl disulfide more in the Ar atmosphere than in the oxygen atmosphere. The dithiane has lower reactivity than the diphenyl disulfide under the same conditions, and lacks reaction selectivity. The reaction with dithiane is believed to proceed mainly as a result of the addition of the thiyl radicals to the SWNTs after being produced by the photoreaction. In the case of the diphenyl disulfide, the selective reaction is believed to take place as follows. The photoexcited semiconductor SWNTs undergo an electron transfer reaction with the disulfide to produce radical ion species. The superoxide anion radicals produced by the reaction of oxygen with the SWNTs anion radicals then produce persulfoxide with the disulfide cation radicals. The persulfoxide intermediate then selectively reacts with the metallic SWNTs, or with the SWNTs of a specific diameter.

Example 9

Figure 14:
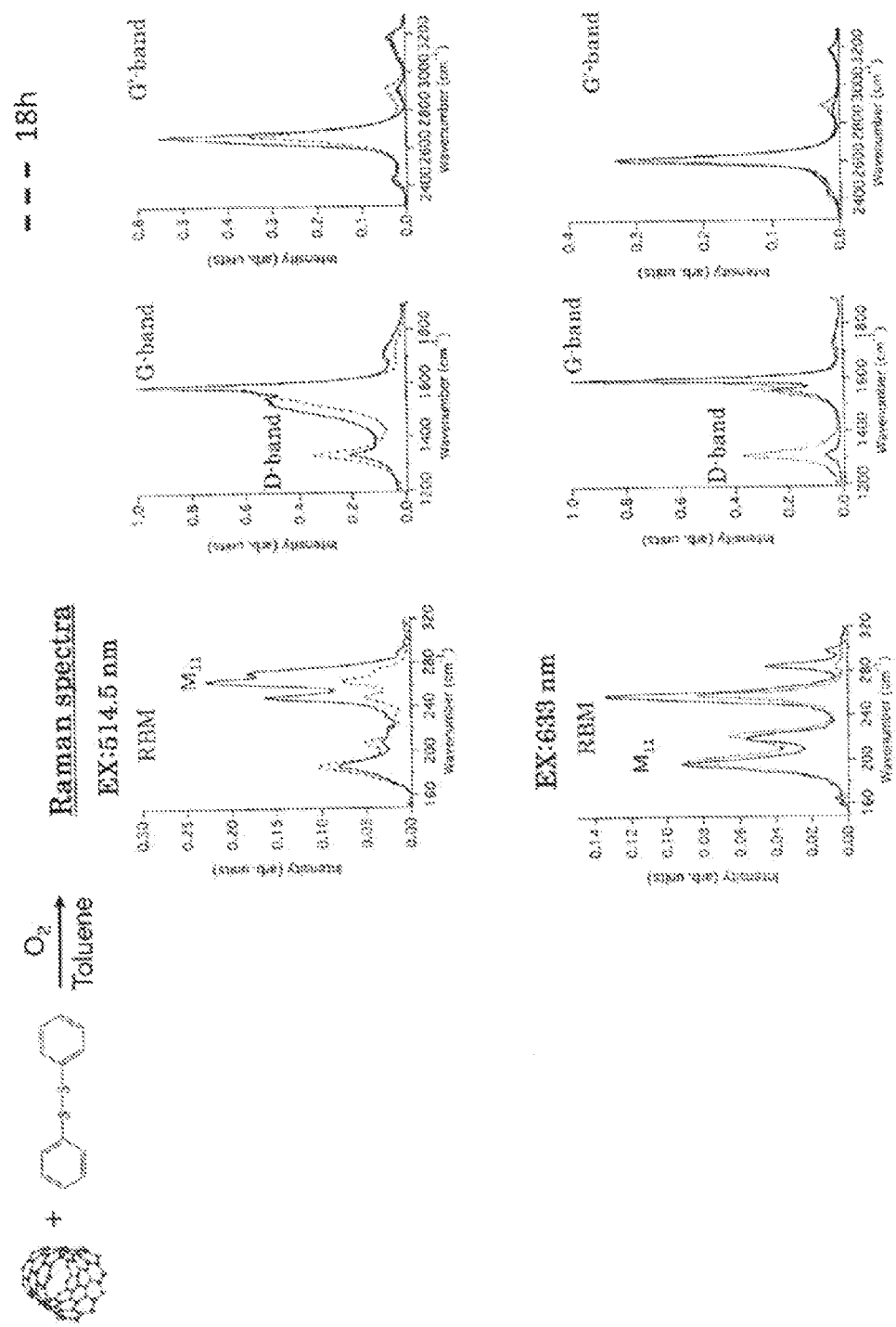
FIG. 14 represents the Raman spectra (excitation wavelengths, 514.5 nm and 633 nm) of the single-walled carbon nanotubes of Example 9.

A photoreaction was performed by using toluene as the organic solvent. A 0.05 M diphenyl disulfide/toluene solution (50 ml) was added to the SWNTs (1.5 mg), and a reaction was performed by photoirradiation in an oxygen atmosphere using a halogen lamp (>300 nm) as the light source. The result is presented in FIG. 14.

The reaction proceeded diameter selectively, not metal selectively, when toluene was used as the organic solvent. In this manner, by selecting an organic solvent, the reactivity of the chemical reaction can be changed from metal selective to diameter selective.

Note that the reaction proceeded in order of metallic SWNTs of thinner diameters, semiconductor SWNTs of thinner diameters, metallic SWNTs of thicker diameters, and semiconductor SWNTs of thicker diameters. RBM changes are as presented in Tables 1 and 2. Diameter d was estimated according to the following equation.

$$d=223.5/(\omega_{RBM}-12.5)$$

TABLE 1

RBM changes in NTs at 514.5 nm

| Raman shift ($cm^{-1}$) | Diameter d (nm) | Peak intensity before reaction | Peak intensity after reaction | Changes (%) |
|---|---|---|---|---|
| 186 | 1.28 | 0.080 | 0.104 | 129 |
| 208 | 1.15 | 0.032 | 0.051 | 160 |
| 248 | 0.95 | 0.163 | 0.052 | 32 |
| 263 | 0.89 | 0.229 | 0.076 | 33 |
| 271 | 0.86 | 0.181 | 0.040 | 22 |

TABLE 2

RBM changes in NTs at 633 nm

| Raman shift ($cm^{-1}$) | Diameter d (nm) | Peak intensity before reaction | Peak intensity after reaction | Changes (%) |
|---|---|---|---|---|
| 196 | 1.22 | 0.091 | 0.089 | 97 |
| 219 | 1.08 | 0.056 | 0.066 | 117 |
| 258 | 0.91 | 0.133 | 0.083 | 62 |
| 283 | 0.83 | 0.046 | 0.007 | 14 |
| 296 | 0.79 | 0.011 | 0.003 | 29 |

Example 10

Figure 15:
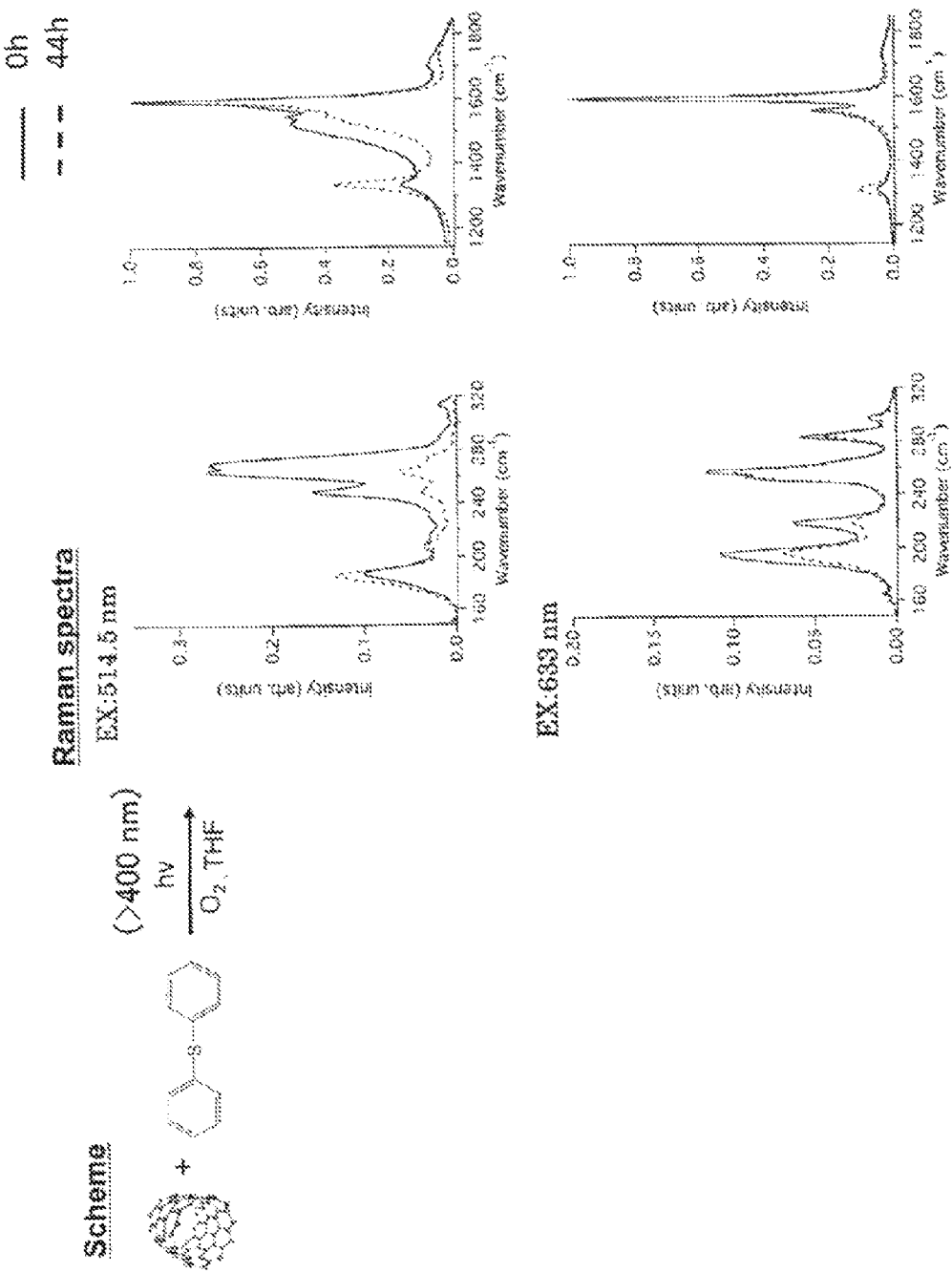
FIG. 15 represents the Raman spectra (excitation wavelengths, 514.5 nm and 633 nm) of the single-walled carbon nanotubes of Example 10.

Photoirradiation (light wavelength 400 nm<) was performed with the organic solvent THF in an oxygen atmosphere, using diphenyl sulfide. Raman spectrum measurement confirmed a decrease in the Raman spectrum attributed to the metallic SWNTs, and an increased $sp^3$ bond-derived D-band peak intensity (FIG. 15), showing that the chemical reaction proceeded selectively for the metallic SWNTs.

The invention claimed is:

1. A method for producing selectively functionalized metallic carbon nanotubes from a raw material carbon nanotubes containing a mixture of metallic carbon nanotubes and semiconductive carbon nanotubes, the method comprising adding a disulfide or a sulfide of the following formula (I) or (II)

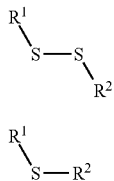

wherein $R^1$ and $R^2$ each independently represent a hydrocarbon group that may have a substituent,
to an organic solvent that contains oxygen to produce an intermediate, and adding the raw material carbon nanotubes containing the mixture of metallic carbon nanotubes and semiconductive carbon nanotubes to the intermediate, wherein the intermediate is reacted with the metallic carbon nanotubes, so as to selectively functionalize the metallic carbon nanotubes.

2. The method for producing selectively functionalized metallic carbon nanotubes according to claim 1, wherein the reaction of selectively functionalizing the metallic carbon nanotubes is processed by photoirradiation.

3. The method for producing selectively functionalized metallic carbon nanotubes according to claim 1, wherein the hydrocarbon group that may have a substituent is an aromatic hydrocarbon group that may have a substituent, a saturated aliphatic hydrocarbon group that may have a substituent, or an alicyclic hydrocarbon group that may have a substituent.

4. The method for producing selectively functionalized metallic carbon nanotubes according to claim 3, wherein the hydrocarbon group that may have a substituent is one of:
a $C_6$-$C_{20}$ aromatic hydrocarbon group that may have at least one substituent selected from a halogen atom, a hydroxyl group, a $C_1$-$C_{40}$ alkoxy group, a $C_2$-$C_{40}$ alkoxycarbonyl group, a $C_6$-$C_{10}$ aryloxy group, and a $C_2$-$C_{40}$ acyl group;
a $C_1$-$C_{40}$ saturated aliphatic hydrocarbon group that may have at least one substituent selected from a halogen atom, a hydroxyl group, a $C_1$-$C_6$ alkoxy group, a $C_2$-$C_6$ alkoxycarbonyl group, a $C_6$-$C_{10}$ aryloxy group, and a $C_2$-$C_8$ acyl group; and
a $C_3$-$C_{40}$ alicyclic hydrocarbon group that may have at least one substituent selected from a halogen atom, a hydroxyl group, a $C_1$-$C_6$ alkoxy group, a $C_2$-$C_6$ alkoxycarbonyl group, a $C_6$-$C_{10}$ aryloxy group, and a $C_2$-$C_8$ acyl group.

5. The method for producing selectively functionalized metallic carbon nanotubes according to claim 1, wherein the organic solvent is tetrahydrofuran, 1,4-dioxane, diethyl ether, benzene, hexane, or cyclohexane.

6. A method for producing selectively functionalized carbon nanotubes by a diameter thereof from a raw material carbon nanotubes containing a mixture of metallic carbon nanotubes and semiconductive carbon nanotubes, the method comprising adding a disulfide or a sulfide of the following formula (I) or (II)

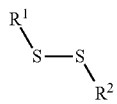

wherein $R^1$ and $R^2$ each independently represent a hydrocarbon group that may have a substituent,
to an organic solvent that contains oxygen to produce an intermediate, and adding the raw material carbon nanotubes containing the mixture of metallic carbon nanotubes and semiconductive carbon nanotubes to the intermediate, wherein the intermediate is reacted with carbon nanotubes having a diameter, so as to selectively functionalize the carbon nanotubes having the diameter.

7. The method for producing selectively functionalized carbon nanotubes by a diameter thereof according to claim 6, wherein the reaction of selectively functionalizing the carbon nanotubes by their diameter is proceeded by photoirradiation.

8. The method for producing selectively functionalized carbon nanotubes by a diameter thereof according to claim 6, wherein the hydrocarbon group that may have a substituent is an aromatic hydrocarbon group that may have a substituent, a saturated aliphatic hydrocarbon group that may have a substituent, or an alicyclic hydrocarbon group that may have a substituent.

9. The method for producing selectively functionalized carbon nanotubes by a diameter thereof according to claim 8, wherein the hydrocarbon group that may have a substituent is one of:
a $C_6$-$C_{20}$ aromatic hydrocarbon group that may have at least one substituent selected from a halogen atom, a hydroxyl group, a $C_1$-$C_{40}$ alkoxy group, a $C_2$-$C_{40}$ alkoxycarbonyl group, a $C_6$-$C_{10}$ aryloxy group, and a $C_2$-$C_{40}$ acyl group;
a $C_1$-$C_{40}$ saturated aliphatic hydrocarbon group that may have at least one substituent selected from a halogen atom, a hydroxyl group, a $C_1$-$C_6$ alkoxy group, a $C_2$-$C_6$ alkoxycarbonyl group, a $C_6$-$C_{10}$ aryloxy group, and a $C_2$-$C_8$ acyl group; and
a $C_3$-$C_{40}$ alicyclic hydrocarbon group that may have at least one substituent selected from a halogen atom, a hydroxyl group, a $C_1$-$C_6$ alkoxy group, a $C_2$-$C_6$ alkoxycarbonyl group, a $C_6$-$C_{10}$ aryloxy group, and a $C_2$-$C_8$ acyl group.

10. The method for producing selectively functionalized carbon nanotubes by a diameter thereof according to claim 6, wherein the organic solvent is toluene or xylene.

* * * * *